United States Patent [19]

Powers et al.

[11] 4,452,929

[45] Jun. 5, 1984

[54] WATER REDUCIBLE EPOXY BASED COATING COMPOSITIONS

[75] Inventors: Edward J. Powers, Charlotte, N.C.; Thomas E. Walsh, Jeffersontown; Donald R. Stewart, LaGrange, both of Ky.

[73] Assignee: Celanese Corporation, New York, N.Y.

[21] Appl. No.: 530,460

[22] Filed: Sep. 9, 1983

[51] Int. Cl.$^3$ ............................................. C08L 63/02
[52] U.S. Cl. .................................. 523/403; 525/524; 528/103; 528/108
[58] Field of Search ............... 523/403, 404; 525/524; 528/103, 108

[56] References Cited

U.S. PATENT DOCUMENTS

| | | | |
|---|---|---|---|
| 3,100,756 | 8/1963 | Fry | 525/524 |
| 3,352,809 | 11/1967 | Carlyle et al. | 528/103 |
| 3,957,716 | 5/1976 | Weldy | 523/404 |
| 4,059,550 | 11/1977 | Shimp | 523/404 |
| 4,289,812 | 9/1981 | Martin | 427/388.4 |
| 4,360,613 | 11/1982 | Shimp | 523/416 |

*Primary Examiner*—Ronald W. Griffin
*Attorney, Agent, or Firm*—Herbert P. Price

[57] ABSTRACT

Aqueous coating composition, useful on metal substrates which are deep drawn after being coated, e.g., bottle caps, are made from (A) a blend of an aqueous solution of the reaction product of a glycidyl polyether of a dihydric phenol, a polyethylene glycol and phosphoric acid, (B) an aqueous dispersion of a glycidyl polyether of a dihydric phenol and, optionally, (C) an alkoxymethylmelamine.

8 Claims, No Drawings

WATER REDUCIBLE EPOXY BASED COATING COMPOSITIONS

BACKGROUND OF THE INVENTION

The field of art to which this invention pertains is water reducible coating compositions made from aqueous dispersions of epoxy resins blended with the reaction product of epoxy resins and polyoxyalkylene polyols terminated with phosphoric acid.

In view of the air pollution caused by organic solvents and to the increasing scarcity and cost of hydrocarbon solvents, there is a continuing search for new and improved coating compositions which can be dissolved or dispersed in water.

Water-borne coatings are being investigated for use in coating metal substrates which after being coated are formed into various objects, e.g., bottle caps, screw caps and can ends. The coatings for such applications must be capable of being deep drawn, must be flexible and must have good adhesion properties.

Water-borne coating compositions capable of being used on flexible substrates are described in commonly assigned U.S. Pat. No. 4,360,613. Such compositions are made from the reaction product of epoxy resins, polyoxyalkylene polyols and phosphoric acid blended with aminoplast resins. Although suitable for flexible substrates, such as aluminum foil and paper board, such coating compositions cannot be deep drawn on metal substrates without some coating failures.

SUMMARY OF THE INVENTION

This invention relates to aqueous coating compositions made from aqueous dispersions of epoxy resins. In another aspect this invention pertains to aqueous coating compositions made from aqueous dispersions of epoxy resins blended with aqueous dispersions of the reaction product of an epoxy resin, a polyoxyalkylene glycol and phosphoric acid. In still another aspect this invention relates to metal closures coated with the aqueous compositions.

The coating compositions of this invention are two component systems, the components being blended before use. One component is an aqueous resinous composition made from the reaction product of (a) about 55 to about 90 weight percent of a glycidyl polyether of a dihydric phenol having an epoxide equivalent weight of about 400 to about 1200; (b) about 8 to about 44.1 weight percent of a polyethylene glycol having a molecular weight of about 300 to about 2000; and (c) about 0.9 to about 2 weight percent of ortho phosphoric acid. The second component is an aqueous dispersion of a glycidyl polyether of a dihydric phenol having an epoxide equivalent weight of about 400 to about 2000. Optionally a third component, a water soluble alkoxymethylmelamine, can also be present in small amounts up to about 10 weight percent based on the weight of all three components.

The coating compositions of this invention can be applied to various substrates, e.g., aluminum, tin-free steel, etc. and the resulting coatings are cured by heating. The coated substrates can then be formed by deep drawing into bottle caps, screw caps, can ends, etc.

DESCRIPTION OF THE INVENTION

First Component

The first component of the coating composition of this invention is an aqueous dispersion of the resinous reaction product of a glycidyl polyether of a dihydric phenol, a polyethylene glycol and ortho phosphoric acid. Such aqueous dispersions are described in U.S. Pat. No. 4,360,613, which is hereby incorporated by reference. In preparing the resinous reaction product, the glycidyl polyether of the dihydric phenol is reacted with the polyethylene glycol and phosphoric acid at a temperature of about 100° to about 150° C. for a time sufficient for substantially all of the epoxide groups to react with the glycol to form ether groups and with the phosphoric acid to form monoester groups.

The glycidyl polyethers of dihydric phenols used in preparing the first component are derivatives of epihalohydrins and dihydric phenols which contain more than 1 to about 2 epoxy groups per molecule. The glycidyl polyethers can be made by reacting a molar excess of epihalohydrin with a dihydric phenol as described in U.S. Pat. No. 2,615,007, or a molar excess of a lower molecular weight glycidyl polyether of a dihydric phenol with additional dihydric phenol as described in U.S. Pat. No. 2,615,008. The molecular weight, melting point and epoxide equivalent weight of such glycidyl polyethers can be varied over a wide range by varying the ratio of epihalohydrin or glycidyl polyether to dihydric phenol. The epoxy equivalent of the glycidyl polyethers useful in this invention are about 400 to about 1200 and, preferably, about 500 to about 750.

The epihalohydrins useful in making the glycidyl polyethers are epichlorohydrin, epibromohydrin and epiiodohydrin with epichlorohydrin being preferred. The dihydric phenols from which the glycidyl polyethers can be made include resorcinol, hydroquinone, p,p'-dihydroxydiphenyl propane or Bisphenol A as it is commonly called, 4,4'-dihydroxydiphenyl sulfone, 4,4'-dihydroxybenzophenone, 4,4'-dihydroxybiphenyl and the like. The most preferred dihydric phenol is p,p'-dihydroxydiphenyl propane.

The polyethylene glycols useful in this invention are polyoxyethylene glycols having terminal primary hydroxyl groups. Such glycols are derived from ethylene oxide and are well known in the art. Polyethylene glycols useful in this invention have molecular weights within the range of about 300 to about 2000 and, preferably, about 500 to about 1200.

The phosphoric acid used in this invention is ortho phosphoric acid and can be utilized in its pure crystalline form or as its hydrate. However, it is preferably used in its usual commercial form which is referred to as concentrated phosphoric acid and is about 80-90 weight percent in water.

The glycidyl polyether of the dihydric phenol, the polyethylene glycol and the phosphoric acid are reacted in the amounts of about 55 to about 90 weight percent glycidyl polyether, about 8 to about 44.1 weight percent glycol and about 0.9 to about 2 weight percent ortho phosphoric acid, the weight percents being based on the total weight of the three reactants. The preferred amounts are about 60 to about 75 weight percent glycidyl polyether, about 24 to about 38.5 weight percent glycol and about 1 to about 1.5 weight percent ortho phosphoric acid. These weight ratios are so adjusted that there is a molar excess of the sum of the polyethylene glycol and phosphoric acid over the glycidyl polyether, i.e., sufficient amounts of glycol and acid are reacted with the glycidyl polyether so that the resulting resin is terminated with reacted glycol and acid groups. The amount of acid used is such that the resulting resinous composition has a minimum of 25 mole percent acid monoester termination, i.e., there is an average of at least one phosphoric acid monoester termination for every two resin molecules formed.

In preparing the resinous composition of the first component, the glycidyl polyether, the polyethylene glycol and the phosphoric acid are heated together at a temperature of about 100° C. to about 150° C. for a time sufficient to complete the reaction. In order to prevent premature gelation of the glycidyl polyether by contact with concentrated phosphoric acid, it is preferred to melt the glycidyl polyether with a portion of the polyethylene glycol while using the remaining glycol to dilute the phosphoric acid. In the preferred process, the glycidyl polyether of the dihydric phenol is blended and heated with 10 to 50 weight percent of the polyethylene glycol. The remaining glycol and the phosphoric acid are then slowly added at a temperature of about 70° C. to about 100° C. After all the glycol and acid are added, the temperature of the reactants is held at about 100° C. to about 150° C., preferably about 105° C. to about 130° C., until the epoxide equivalent weight of the reaction mixture is above 4000, i.e., substantially infinity. Generally the time required to complete the reaction will be about 2 to about 10 hours.

The reaction of the glycol, the glycidyl polyether and the phosphoric acid is conducted in the absence of solvents. When the reaction is completed, the warm, fluid reaction product can be dissolved in water with or without ammonia or volatile amine salting. However, in order to facilitate handling and pigmentation of the reaction product, it can be reduced to a pourable or pumpable liquid solution with selected organic solvents. Generally up to about 50 weight percent solvent, based on total solution weight can be used. Useful solvents are water soluble or water dispersible ones, e.g., alcohols and glycol ethers. Examples of such solvents include isopropanol, n-propanol, n-butanol, 2-ethoxyethanol, 2-propoxyethanol, diacetone alcohol and diethylene glycol monobutyl ether.

The resinous compositions used in the first component are water reducible with or without the addition of a base to salt the residual acidity of the resin-bound phosphoric acid esters. Translucent (nearly transparent to hazy) microemulsions are formed by blending the resin, preferably dissolved in an alcoholic solvent, with sufficient water to lower the resin solids to about 20–50 percent N.V. The components can be blended together in any sequence at room temperatures using low or high shear mixing. The preferred procedure is to add a volatile amine or ammonia to the resinous product and then add water with stirring to the desired non-volatile range. If the first component is pigmented, the pigments, preferably, are ground into the resinous product before the addition of the volatile amine or ammonia.

Volatile bases used to salt the phosphoric acid ester terminated resinous compositions are ammonia and amines. Useful amines include N-methyl morpholine, diethanolamine, N-ethylmorpholine, N-methylethanolamine, N-methyldiethanolamine, triethylamine, dimethylaminoethanol and the like. The amount of volatile base that can be used will vary from about 0 up to about 3 moles per each mole of reacted phosphoric acid in the resinous composition. Preferably about 1 to about 2 moles of base are used per mole of reacted acid.

If the coating composition of this invention is to be pigmented, the pigments are preferably ground or dispersed in the first component. Useful pigments are titanium dioxide, silica, clays, colored pigments and the like. The amounts of pigments to be used will depend upon the specific end use of the coating composition. Such amounts are well known and can be easily determined by those skilled in the art.

Second Component

The second component used in the water-reducible coating composition of this invention is an aqueous dispersion of a water insoluble glycidyl polyether of a dihydric phenol having an epoxide equivalent weight of about 400 to about 2000.

The glycidyl polyethers of the dihydric phenols are derivatives of epihalohydrins and dihydric phenols prepared as described hereinbefore in the description of the first component. The epihalohydrins and dihydric phenols used in making the glycidyl polyethers are also the same as those used in preparing the first component. The preferred glycidyl polyether is derived from p,p'-dihydroxydiphenyl propane and has an epoxide equivalent weight of about 500 to about 650.

The aqueous dispersions of glycidyl polyethers of dihydric phenols can be made by well-known dispersion techniques which involve mixing the glycidyl polyether, water and a nonionic surfactant with high shear agitation until a small particle size dispersion is formed. When no solvent is used, the agitation is conducted at a temperature at which the glycidyl polyether can be dispersed into small particles. The dispersion reaction can also be conducted with the glycidyl polyether being dissolved in a suitable solvent, such solvents being the alcohols and glycol ethers used in preparing the first component. The amount of organic solvent used in this second component will vary from 0 to about 50 weight percent based on the total weight of the solution.

The aqueous dispersions of glycidyl polyethers of dihydric phenols can also be made using the processes described in U.S. Pat. Nos. 4,122,067 and 4,315,044, which patents are hereby incorporated by reference. In U.S. Pat. No. 4,122,067, aqueous dispersions of polyglycidyl polyethers of polyhydric phenols are prepared by reacting a low molecular weight diglycidyl ether of a dihydric phenol with additional dihydric phenol in water in the presence of a nonionic surfactant.

In U.S. Pat. No. 4,315,044, self-emulsifying glycidyl polyethers are prepared by reacting (a) a diglycidyl ether of a dihydric phenol, (b) a dihydric phenol, and (c) a diglycidyl ether of a polyoxyalkylene glycol. The resulting glycidyl polyethers can be dispersed in water with or without organic solvent.

The aqueous dispersions of glycidyl polyethers of dihydric phenols useful in this invention have solids contents of about 30 to about 70 weight percent.

Additional Components

In addition to the first and second components, the coating composition of this invention can contain, as an optional component, a water soluble or water dispersible alkoxymethylmelamine. Such melamine derivatives are made from melamine, formaldehyde and an alcohol, preferably a monohydric alcohol having 1 to 4 carbon atoms. Examples of such melamine derivatives are trimethoxymethylmelamine, hexamethoxymethylmelamine, methylated polymeric melamine-formaldehyde resins and butylated polymeric melamine-formaldehyde resins. The preferred water soluble or water dispersible alkoxymethylmelamines are trimethoxymethylmelamine and hexamethoxymethylmelamine.

The composition of this invention can also contain dispersing agents, leveling agents, wetting agents, antifoaming agents and the like.

Component Preparation

The following examples describe in detail the preparation of two resinous compositions which can be used as the First and Second Components of this invention. Parts and percentages unless otherwise designated are parts and percentages by weight.

EXAMPLE A

The First Component Preparation

To a suitable reactor were added 5079 parts of the diglycidyl ether of Bisphenol A having an epoxide equivalent weight of 190 and 1852 parts of Bisphenol A. Agitation was begun, a nitrogen sparge was started and heat was applied. When the temperature reached 93° C., 6.6 parts of triphenyl phosphine were added. The temperature rose to 171° C. and was held at 160° C. until the Gardner-Holdt viscosity of a 50% solution of the reaction product in ethylene glycol monoethyl ether was I. When this viscosity was reached, 455 parts of polyoxyethylene glycol having an average molecular weight of 1000 and 2007 parts of polyoxyethylene glycol having an average molecular weight of 600 were added to the reactor with the temperature dropping to 93° C. When thoroughly mixed, a mixture of 1277 parts of polyoxyethylene glycol having an average molecular weight of 600 and 141 parts of phosphoric acid (85% in water) was slowly added. The temperature was then raised to 110°–115° C. and was held for three hours. At the end of this heating period the epoxide equivalent weight was about 4500. A solution of 10.9 parts of phosphoric acid (85% in water) plus 107.6 parts of water was added while holding the temperature at 110°–115° C. Propoxyethanol, 4490 parts, was added over a 30 minutes period and the temperature was held at 110°–115° C. for 2 hours. The reaction product solution was then cooled and strained through a 400 micron bag. The resulting product had a solids content of 70%, a Gardner-Holdt viscosity at 25° C. of $Z_5$ and a weight per gallon of 9.15 lbs.

EXAMPLE B

The Second Component Preparation

To a suitable reactor were added 4529 parts of the diglycidyl ether of Bisphenol A having an epoxide equivalent weight of 190 and 1559 parts of Bisphenol A. Agitation was begun and the temperature was raised to 66° C. Deionized water, 225 parts, was then added followed by 16 parts of triphenyl phosphine. The temperature was raised to 82° C. and then it rose to 95° C. due to the exothermic reaction. The temperature was held at 93°–99° C. for two hours. At the end of this period the epoxide equivalent weight of the reaction product on a solids basis was 620. Agitation was increased and the temperature was lowered to about 80° C. A nonionic surfactant solution, 1338 parts of a 40% solution in 77/23 water/toluene of the reaction product of 2 moles of polyoxyethylene glycol having an average molecular weight of 8000 and 1 mole of the glycidyl ether of Bisphenol A having an epoxide equivalent weight of 490, was then added followed by the addition of 201 parts of hexamethoxymethyl melamine. Agitation with the temperature at 80° C. was continued for 30 minutes. A vacuum was applied sufficient to distill water at 60°–65° C. Distillation was continued at 60°–65° C. for 1 hour with 330 parts of water being removed. The particle size of the dispersed particles was determined by microscopic measurement to be less than 5 microns. Deionized water, 3642 parts, was then added at the rate of 45 parts/min. When all the water was in, agitation at a high rate was continued for 15 minutes. The agitation was reduced and the temperature was reduced to 38° C. The resulting dispersion was strained through 80 mesh bags and was drummed. The dispersion product had a solids content of 60%, a particle size of less than 5 microns, a pH of 6.5, a weight/gallon of 9.2 lbs., a viscosity at 25° C. of 10,000 cps and an epoxide equivalent weight, on solids basis, of 635.

THE WATER REDUCIBLE COATING COMPOSITION

To prepare the coating composition of this invention, the first component and the second component are blended together. If the coating is to be clear and unpigmented, the first component, as described in Example A, can be used as is. However, the first component is generally formulated with a volatile water soluble amine or ammonia, wetting agents, leveling agents and antifoam agents plus additional water to obtain good handling properties. Generally, the amine will be added in amounts of about 1 weight percent to about 5 weight percent based on the weight of the resin solids of the first component. The other components, wetting agents, leveling agents, antifoam agents and the like are added in amounts sufficient to obtain the desired results, such amounts being readily determined by routine experimentation. The amount of water added is that amount required to obtain proper handling properties. Generally, this amount of water will be about 25 to about 200 weight percent based on the weight of the resin solids in the first component.

If the coating composition is to be pigmented, then the pigments are preferably ground and dispersed in the first component. Such pigments are used in amounts sufficient to obtain good hiding and esthetic properties.

The second component is generally used in the form described in Example B. However, for handling properties, additional water can be added.

As stated hereinbefore, an additional component, an alkoxymethylmelamine, can be utilized in this invention. Preferably this third component is added to the second component prior to preparing the coating composition of this invention. Two components are much easier to use and are preferred by commercial applicators.

After blending the components, the coating composition of this invention will contain about 30 to about 60 weight percent of the reaction product of epoxy resin, polyalkylene glycol and phosphoric acid (from the first component), about 40 to about 60 weight percent epoxy resin (from the second component) and 0 to about 10 weight percent alkoxymethylmelamine (from the additional component). Preferably, the coating composition will contain about 40 to about 53 weight percent reaction product, about 45 to about 55 weight percent epoxy resin and about 2 to about 5 weight percent alkoxymethylmelamine. A particularly preferred coating composition contains 46 weight percent epoxy resin, polyoxyalkylene glycol, phosphoric acid reaction product, 50 weight percent epoxy resin and 4 weight percent alkoxymethylmelamine. These weight percentages are all based on the total weight of reaction product, epoxy resin and alkoxymethylmelamine.

The coating compositions of this invention can be applied to a substrate, particularly a metal substrate, by any of the well known methods, e.g., spraying, dipping, roll coating, reverse roll coating and the like. However, a preferred method of application is roll coating. The coating compositions can be cured by heating at about 150° C. to about 260° C. for about 5 minutes to about 30 minutes, and, preferably, about 190° C. to 205° C. for 8 to 12 minutes.

The coating compositions of this invention are particularly useful for coating metal subtrates, e.g., aluminum and tin-free steel, which, after being coated, are formed into bottle caps, screw caps for jars and bottles, and can ends. For such applications, the coatings must be capable of being deep drawn, must be flexible and must have good adhesion properties.

The following examples describe the invention in more detail. Parts and percentages unless otherwise designated are parts and percentages by weight.

EXAMPLE 1

Part 1

To 31.5 parts of Example A were added 40.5 parts of titanium dioxide. The mixture was ground on a Cowles Dispersator to a fine particle size—Hegman 8. A premix of 0.85 part of N-methyl morpholine in 20 parts of water were added with mixing followed by a pre-mix of 6 parts water, 0.09 part of fluorochemical surfactant, 0.45 part of leveling reflow agent and 0.6 part of antifoaming agent.

Part 2

To 45 parts of Example A were added 1.1 parts of N-methyl morpholine and 45 parts of water with mixing. A pre-mix of 0.1 part of fluorochemical surfactant, 0.6 part of leveling and reflow agent and 0.9 part of antifoaming agent in 7.2 parts of water were added.

Part 3

To 95 parts of Example B were added 5 parts of trimethoxymethylmelamine.

White Coating Composition

To 70 parts of Part 1 were added with good agitation 30 parts of Part 3. Sufficient water was then added to obtain a 40-50 second viscosity as measured by a #4 Ford Cup.

Clear Coating Composition

To 60 parts of Part 2 were added with good agitation 40 parts of Part 3.

Application

The White Coating Composition was applied to a tin-free steel sheet using a Meyer bar at a thickness which corresponded to a weight of 9 pounds per 3000 sq. ft. This coating was baked at 204° C. for 10 minutes. The white coated steel sheet, after cooling, was overcoated with the Clear Coating Composition at a thickness which corresponded to a weight of 3 pounds per 3000 sq. ft. and was baked at 204° C. for 10 minutes.

The coated steel was fabricated into soft drink bottle caps, medicine bottle caps and screw caps for jars using a plunger and die. The coatings withstood the deep drawing with no failures.

EXAMPLE 2

To 17.38 parts of Example A were added 33.33 parts of titanium dioxide. After grinding on a Cowles Dispersator to a Hegman 8 particle size, 0.44 part of N-methyl morpholine and 19.44 parts of water were added with mixing followed by 0.4 part of fluorochemical surfactant and 0.2 part of leveling reflow agent (Package 1).

Trimethoxymethylmelamine, 1.19 parts, plus 0.5 part of water were mixed with 22.02 parts of Example B and 5.1 parts of water (Package 2).

Package 1 was blended with Package 2 and sufficient water was added to reduce the viscosity to 40-50 seconds as measured by a #4 Ford Cup. The resulting white coating composition was applied to aluminum sheets with a Meyer rod at a thickness of about 0.6 mil (about 9 pounds per 3000 sq. ft.). The coating was baked for 10 minutes at 204° C. The coated sheets were then formed into screw top soft drink bottle caps. The coatings withstood the forming operations with no failures.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. A coating composition comprising
   A. an aqueous solution of a resinous composition which is the reaction product of:
      (i) about 55 to about 90 weight percent of a glycidyl polyether of a dihydric phenol having an epoxide equivalent weight of about 400 to about 1200;
      (ii) about 8 to about 44.1 weight percent of a polyethylene glycol having a molecular weight of about 300 to about 2000; and
      (iii) about 0.9 to about 2 weight percent of ortho phosphoric acid;
      wherein said aqueous solution has a solids content of about 20 to about 50 weight percent;
   B. an aqueous dispersion of a glycidyl polyether of a dihydric phenol having an epoxide equivalent weight of about 400 to about 2000, wherein said aqueous dispersion has a solids content of about 30 to about 70 weight percent; and
   C. an alkoxymethylmelamine
   wherein A, B, and C are blended in such amounts that the coating composition contains about 30 to about 60 weight percent of the reaction product of A, about 40 to about 60 weight percent of the glycidyl polyether of B and 0 to about 10 weight percent of C, said weight percents being based on the total weight of reaction product, glycidyl polyether and alkoxymethylmelamine.

2. The coating composition of claim 1 wherein the glycidyl polyether of a dihydric phenol in A and in B is a glycidyl polyether of p,p'-dihydroxydiphenyl propane.

3. The coating composition of claim 2 wherein the glycidyl polyether of p,p'-dihydroxydiphenyl propane of A has an epoxide equivalent weight of about 500 to about 750 and the glycidyl polyether of p,p'-dihydroxydiphenyl propane of B has an epoxide equivalent of about 500 to about 650.

4. The coating composition of claim 1 wherein the polyethylene glycol has a molecular weight of about 500 to about 1200.

5. The coating composition of claim 1 wherein the resinous composition of A is the reaction product of about 60 to about 75 weight percent glycidyl polyether of a dihydric phenol, about 24 to about 38.5 weight percent polyethylene glycol and about 1 to about 1.5 weight percent phosphoric acid.

6. The coating composition of claim 1 wherein the alkoxymethylmelamine is hexamethoxymethylmelamine.

7. The coating composition of claim 1 wherein the alkoxymethylmelamine is trimethoxymethylmelamine.

8. The coating composition of claim 1 wherein A, B and C are blended in such amounts that the coating composition contains about 40 to about 53 weight percent reaction product of A, about 45 to about 55 weight percent of the glycidyl polyether of B and about 2 to about 5 weight percent of C.

* * * * *